(12) United States Patent
Pilegaard et al.

(10) Patent No.: US 11,703,367 B2
(45) Date of Patent: Jul. 18, 2023

(54) MODULAR ULTRASONIC FLOW METER HAVING A POWER SUPPLY CONTAINED IN A WATERTIGHT METER HOUSING

(71) Applicant: Kamstrup A/S, Skanderborg (DK)

(72) Inventors: Lasse Pilegaard, Skanderborg (DK); Kaspar Raahede Aarøe, Skanderborg (DK); Kenneth Hoe Baunsgaard, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 324 days.

(21) Appl. No.: 17/257,605

(22) PCT Filed: Jul. 3, 2019

(86) PCT No.: PCT/EP2019/067875
§ 371 (c)(1),
(2) Date: Jan. 4, 2021

(87) PCT Pub. No.: WO2020/007927
PCT Pub. Date: Jan. 9, 2020

(65) Prior Publication Data
US 2022/0136880 A1 May 5, 2022

(30) Foreign Application Priority Data
Jul. 4, 2018 (EP) .................................. 18181635

(51) Int. Cl.
*G01F 1/66* (2022.01)
*G01F 15/063* (2022.01)
(52) U.S. Cl.
CPC ............ *G01F 1/662* (2013.01); *G01F 15/063* (2013.01)
(58) Field of Classification Search
None
See application file for complete search history.

(56) References Cited

U.S. PATENT DOCUMENTS 9,182,260 B2 * 11/2015 Nielsen .................... G01F 1/66
9,335,192 B2 * 5/2016 Nielsen .................. G01F 15/14
(Continued)

FOREIGN PATENT DOCUMENTS

| CN | 101393047 A | 3/2009 |
|---|---|---|
| CN | 104390670 A | 3/2015 |

(Continued)

OTHER PUBLICATIONS

European Search Report completed Dec. 12, 2018, for European Application No. EP18181635.
(Continued)

*Primary Examiner* — Harshad R Patel
(74) *Attorney, Agent, or Firm* — Renner, Otto, Boisselle & Sklar, LLP

(57) ABSTRACT

A modular ultrasonic flow meter including a substantially watertight meter housing connected to a flow tube; a measurement printed circuit board including a measurement circuit communicating with one or more ultrasonic transducers, arranged in the meter housing for transmitting and receiving ultrasonic signals; and a self-contained power supply. The ultrasonic flow meter further includes a control module comprising a module housing connected with a main printed circuit board including a central processing unit, a memory circuit and a communication circuit, and a power- and communication connection is provided between the main printed circuit board of the control module and the measurement printed circuit board whereby the self-contained power supply may power the main printed circuit board and the measurement printed circuit board.

13 Claims, 3 Drawing Sheets

(56) References Cited

U.S. PATENT DOCUMENTS

| | | | |
|---|---|---|---|
| 10,845,223 B2* | 11/2020 | Drachmann | G01F 15/075 |
| 10,895,480 B2* | 1/2021 | Bottner | G01F 1/667 |
| 11,118,951 B2* | 9/2021 | Pilegaard | G01F 1/667 |
| 11,287,311 B2* | 3/2022 | Forster-Knight | G01H 11/08 |
| 2009/0174514 A1 | 7/2009 | Allen | |
| 2011/0162463 A1 | 7/2011 | Allen | |
| 2012/0031198 A1* | 2/2012 | Skallebaek | G01F 1/662 |
| | | | 29/840 |
| 2013/0139610 A1* | 6/2013 | Laursen | G01F 15/14 |
| | | | 73/861.18 |
| 2016/0223374 A1* | 8/2016 | Buckl | G01F 1/665 |
| 2021/0223077 A1* | 7/2021 | Liu | H05K 1/181 |

FOREIGN PATENT DOCUMENTS

| | | |
|---|---|---|
| DE | 202007011493 U1 | 10/2007 |
| EP | 2236998 A1 | 10/2010 |
| EP | 2840362 A1 | 2/2015 |
| WO | 2011127934 A1 | 10/2011 |
| WO | 2017186248 A1 | 11/2017 |

OTHER PUBLICATIONS

International Search Report and Written Opinion dated Sep. 26, 2019, for International Patent Application No. PCT/EP2019/067875.
Communication pursuant to Article 94(3) EPC dated Sep. 8, 2022, for corresponding European Patent Application No. 19734114.2.
Examination Report dated Jan. 27, 2022, for corresponding European Patent Application No. 19734114.2.

* cited by examiner

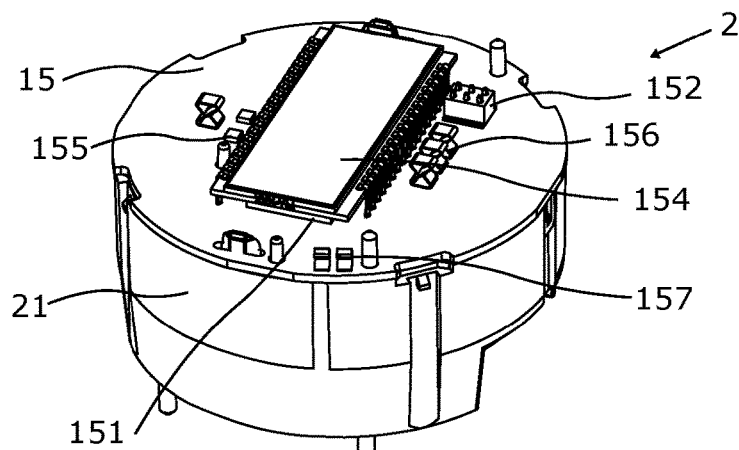
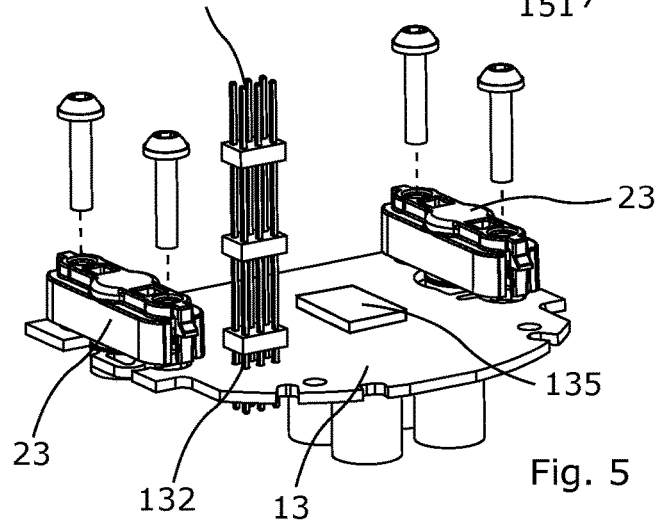
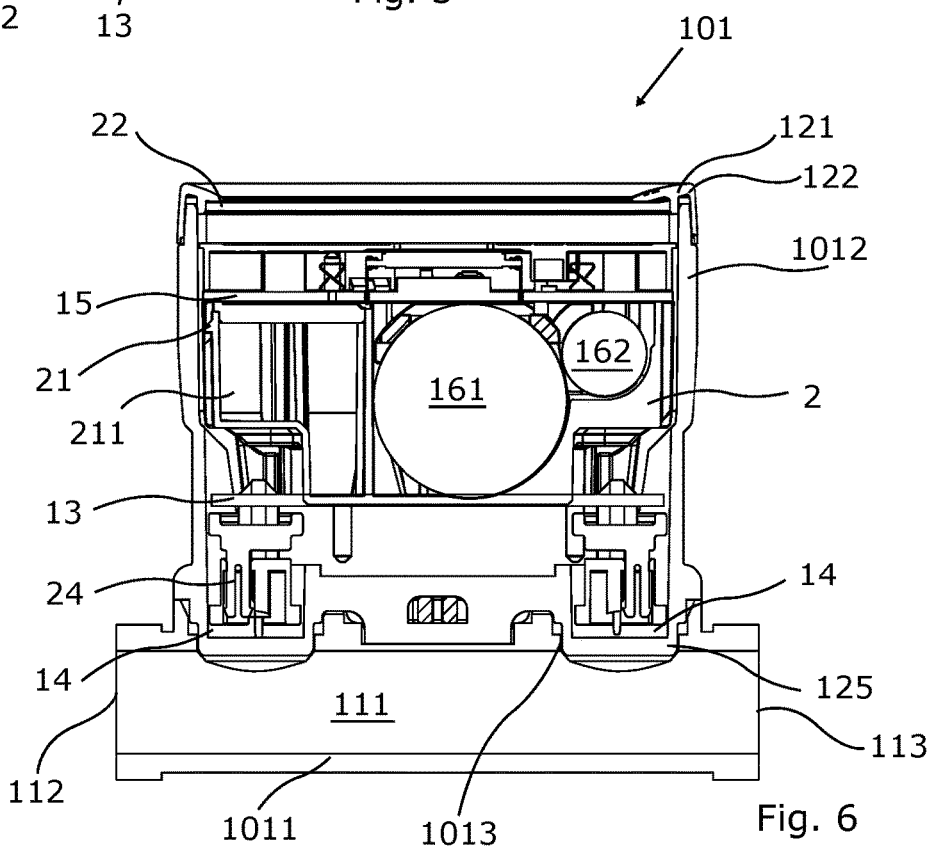

MODULAR ULTRASONIC FLOW METER HAVING A POWER SUPPLY CONTAINED IN A WATERTIGHT METER HOUSING

This application is a national phase of International Application No. PCT/EP2019/067875 filed Jul. 3, 2019, which claims priority to European Patent Application No. 18181635.6 filed Jul. 4, 2018.

FIELD OF THE INVENTION

The present invention relates to a modular ultrasonic flow meter including a control module containing a central processing unit and a self-contained power supply arranged to power other modules of the meter.

BACKGROUND OF THE INVENTION

Ultrasonic flow meters are widely used as consumption- or utility meters for measuring consumption of water or other utilities such as water born heating or cooling. Ultrasonic flow meters, sometimes referred to as solid-state flow meters, are electronic devices without any moving parts compared to traditional mechanical flow meters. With an operational life of up to 15 years, having no exposed moving parts poses obvious advantages. The principles of ultrasonic flow metering are generally known and based on ultrasonic signals being sent in opposite directions through the medium to be measured. When the medium is flowing, the time for the signals to go upstream is slower than downstream and the relationship between the two is in direct proportion to the speed of the medium flow.

With the shift from overall mechanical devices to electronic devices, flow meters are becoming increasingly "smart" with new electronic based functionality being introduced. In addition to the ultrasonic measuring technology, flow meters often include integrated radio communication devices for remote reading, onboard data processing capabilities, etc.

As the functionality of the meter requires operational power, a self-contained power source, often a battery, is also included in the flow meter. However, batteries and electronic circuits in combination with the exposure to water or other fluids and an often harsh external environment poses a notorious challenge. Sealing a polymer meter housing containing electronics and thereby preventing direct water ingress is not sufficient as diffusion will result in water molecules entering the housing over time. For this reason it is extremely important to be able to control the internal conditions of a flow meter, such as humidity, over time. Controlling humidity may amongst others be done by arranging a desiccant inside a meter housing.

With an increasing focus on environmental issues, including water scarcity, water metering is on the rise resulting in more metering points on a global scale. With an increasing number of metering points, water meter manufacturability becomes an important factor and even minor improvements may have a significant impact on the total cost of a metering infrastructure including tenth of thousands of meters.

One way of reducing development- and manufacturing costs across an entire product platform is through standardization and modularization. Using identical modules in different product may amongst others reduce complexity and postpone creation of variance. Hence, ultrasonic flow meter incorporating standardized modules that may be independently manufactured and assembled during the final stages of the manufacturing process would be advantageous.

OBJECT OF THE INVENTION

An object of the present invention is to provide a modular ultrasonic flow meter that solves the above mentioned disadvantages and drawbacks of the prior art. In particular, it may be seen as a further object of the present invention to provide an ultrasonic flow meter incorporating standardized modules that may be independently manufactured, tested and verified before being assembled to a final operational flow meter.

SUMMARY OF THE INVENTION

Thus, the above described object and several other objects are intended to be obtained in a first aspect of the invention by providing a modular ultrasonic flow meter including: a flow tube providing a flow channel extending between an inlet and an outlet; a substantially watertight meter housing connected to the flow tube; a measurement printed circuit board including a measurement circuit communicating with one or more ultrasonic transducers, arranged in the meter housing for transmitting and receiving ultrasonic signals through the flow channel; and a self-contained power supply; wherein the ultrasonic flow meter includes a control module comprising a module housing connected with a main printed circuit board including a central processing unit, a memory circuit and a communication circuit, a power- and communication connection being provided between the main printed circuit board and the measurement printed circuit board, and the self-contained power supply being arranged in the module housing to power the main printed circuit board and the measurement printed circuit board.

The communication connection between the main printed circuit board and the measurement circuit board may advantageously be digital providing digital communication between the processors of the main printed circuit board and the measurement printed circuit board. Also, each of the main printed circuit board and the measurement printed circuit board may include a connector mutually connected by a connecting element adapted for providing the power- and communication connection.

The above embodiment of an ultrasonic flow meter realizes a modular ultrasonic flow meter including a measurement module for measuring flow and a control module for controlling the overall operation of the flow meter comprised, hereunder controlling and facilitating communication with external systems and devices, such as advanced meter infrastructure systems or automated meter reading systems. The modular construction of the flow meter provide for increased testing of subsystem before final assembly and thereby enable postponement of variance creation. More specifically, the measuring module including the meter housing and measurement printed circuit board, may be individually tested and verified before the final meter is assembled. Test and verification of the meter module may be performed by connecting appropriate equipment to the connector provided on the measurement printed circuit board.

Furthermore, using a common self-contained power supply for powering both the control module and the measurement module significantly reduces costs compared to a system based on separate power supplies for each module.

Also, the measurement printed circuit board and the one or more ultrasonic transducers may be mounted in a bottom part of the meter housing and the control module be adapted to be inserted into the meter housing on top of the measurement circuit board. Arranging the control module on top of the measurement module provides for a meter adapted for automated manufacturing.

Additionally, the module housing may include a compartment for storing a desiccant. Despite the meter housing being watertight, diffusion may cause water molecules to enter the housing over time. The desiccant serves to absorb such water molecules thereby protecting electronic components arranged in the meter housing.

Including the self-contained power supply, such as a battery pack, and the desiccant in the control module also gives other advantages in terms of manufacturing. The battery pack and desiccant has a limited lifetime and necessitates certain restriction on the final meter or sub-assemblies thereof. For example, subjecting the desiccant to humid connections will reduce its effect in the final meter, which may reduce the lifetime of the meter. Therefore it is difficult to handle sub-assemblies of a meter containing a desiccant and such subassemblies may have a limited lifetime. The same goes for the battery-pack.

Furthermore, the main printed circuit board may comprises an additional connector for connecting a peripheral device arranged inside the meter housing, the additional connector being adapted for powering the peripheral devices and for providing communication between the central processing unit and the peripheral device. The measurement printed circuit board may also comprises an additional connector for connecting a peripheral device arranged in the meter housing, the additional connector being an alternative or supplement to the additional connector of the main printed circuit board. Further, the self-contained power supply may be electrically connected only to the main printed circuit board and the measurement printed circuit board and any peripheral devices be supplied via the main printed circuit board. The peripheral device connected to the measurement printed circuit board may by powered by and communicating with the main printed circuit board via the measurement printed circuit board. Providing additional connectors allow for additional devices, such as sensors of valves, being included as additional modules in the modular ultrasonic flow meter.

Moreover, the ultrasonic flow meter may further comprising a front plate element mounted on top of the control module to cover the main printed circuit board and an antenna element connected with the communication circuit of the main printed circuit board may be mounted on a circumferential edge of the front plate element.

Embodiments of an ultrasonic flow meter according to the invention may further include a display element mounted on the main printed circuit board, wherein the display element is arranged to be read through a transparent cover element and an opening provided in a top surface of the front plate element.

Furthermore, the meter housing may be integrated with and extend from the flow tube. Alternatively, the meter housing may be mounted on the flow tube. Also, the transducers may be surface mounted on the measurement printed circuit board.

The different aspect of the present invention may each be combined with any of the other aspects. These and other aspects of the invention will be apparent from and elucidated with reference to the embodiments described hereinafter.

BRIEF DESCRIPTION OF THE FIGURES

The assembly for an ultrasonic flow meter and ultrasonic flow meter according to the invention will now be described in more detail with regard to the accompanying figures. The figures show one way of implementing the present invention and is not to be construed as being limiting to other possible embodiments falling within the scope of the attached claim set.

FIG. 4b shows the top-module without the front plate, FIG. 4c shows the top-module without the module housing, FIG. 5 shows a measuring printed circuit board including connector-element and transducer backing devices, and FIG. 6 shows a modular ultrasonic flow meter including meter housing mounted on a flow tube.

DETAILED DESCRIPTION OF AN EMBODIMENT

Figure 1:
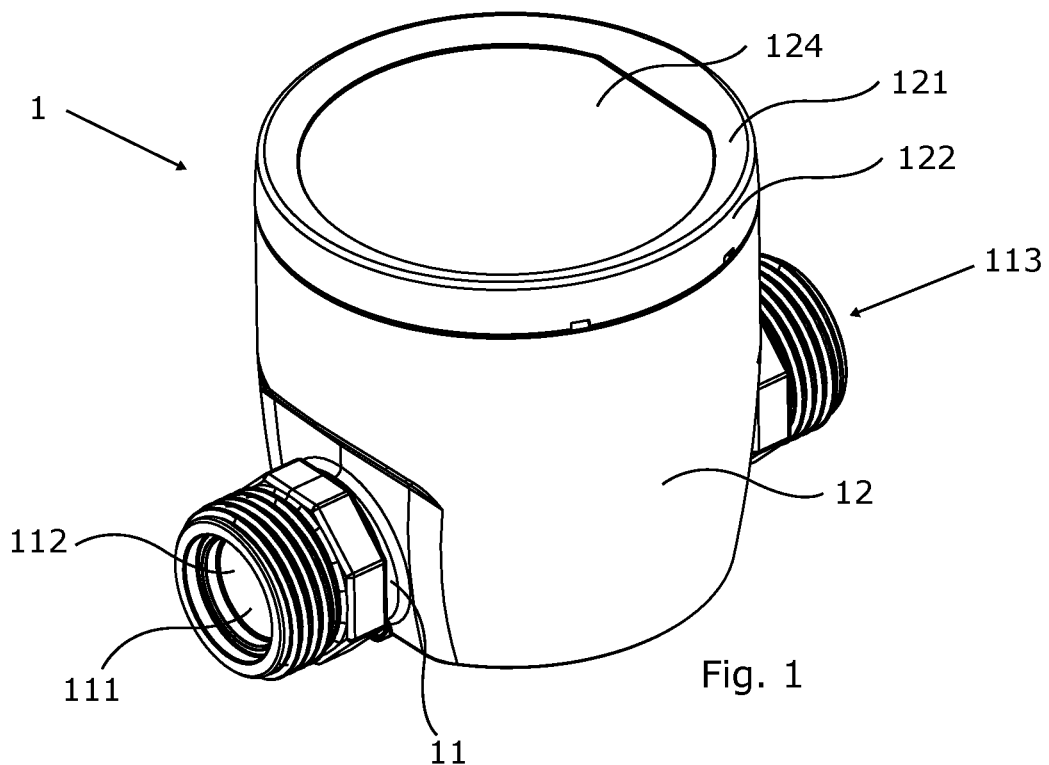
FIG. 1 shows a modular ultrasonic flow meter.
Figure 2:
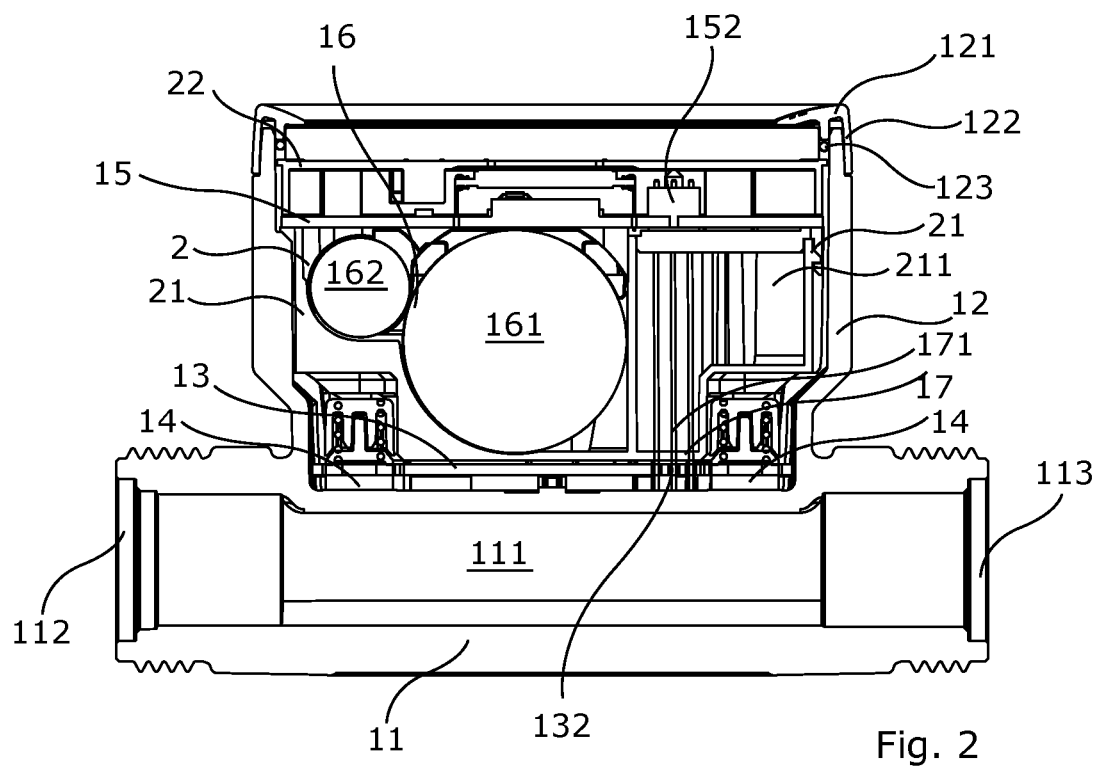
FIG. 2 shows a transversal cross-section of a modular ultrasonic flow meter.

FIGS. 1 and 2 illustrate a modular ultrasonic flow meter 1 according to one embodiment of the invention. The flow meter comprises a flow tube 11 with a flow channel 111 for passage of a fluid between an inlet 112 and an outlet 113. A meter housing 12 is formed as an integrated part of the flow tube thereby providing a compartment for meter components amongst others configured to measure the flow rate of a fluid flowing in the flow channel. The meter housing is closed-off by a lid 121 constituted by a locking ring 122 and a transparent cover element 124. Between the lid and the flow meter housing a sealing element 123 is arranged to provide a water-tight seal.

Figure 3:
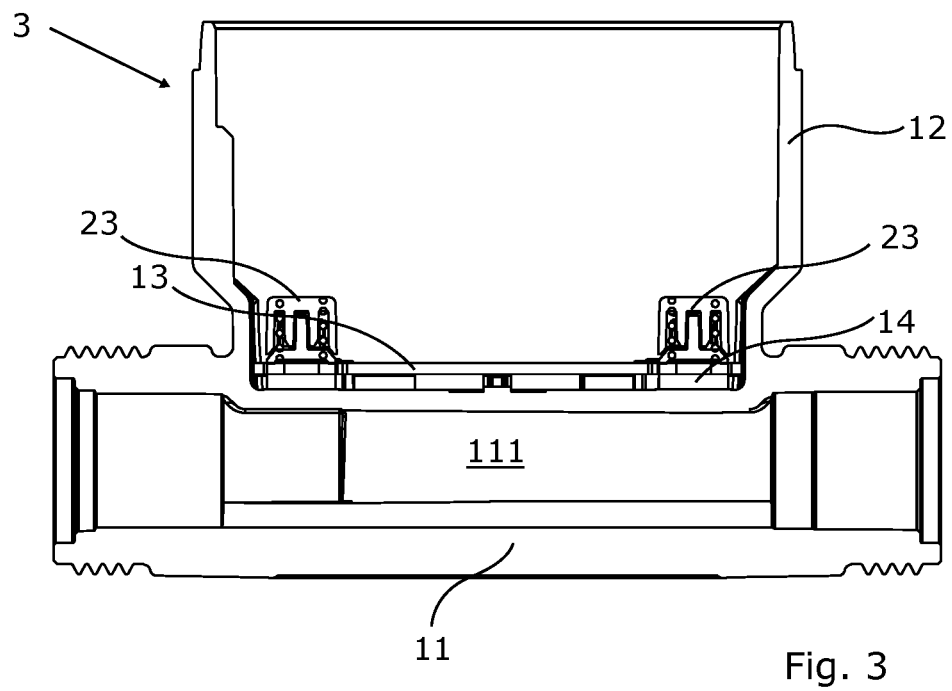
FIG. 3 shows a transversal cross-section of a measuring module of a modular ultrasonic flow meter.

Referring to FIG. 3, a measurement printed circuit board (measurement PCB) 13 is mounted in a bottom part of the meter housing. The measurement PCB includes a measurement circuit communicating with two ultrasonic transducers 14 arranged in the meter housing to transmit and receive ultrasonic signals through the flow tube. In the shown embodiment, the ultrasonic transducers are mounted on a lower side of the PCB with a lower side of the ultrasonic transducers, opposite the PCB, arranged against an outer surface of the flow tube 11. In other embodiments, the ultrasonic transducers may be separate from the measurement PCB and electrically connected to the measurement circuit via additional transducer connectors. The meter circuit is configured for operating the ultrasonic transducers to transmit and receive ultrasonic wave packets through the flow tube and a fluid present in the flow channel. An ultrasonic wave packets are generated by one transducers is transmitted through the wall of the flow pipe. Inside the flow channel the wave packet is reflected by one or more reflectors (not shown) and thereby directed to the other transducer, which is operated as a receiver transducer for the respective wave packet. Subsequently, the transducers switch functionality so that the transducer once operated as a transmitter now functions as a receiver and vice versa. In one embodiment, two reflectors are arranged in the flow channel thereby enabling the ultrasonic wave packet to follow a U-shaped path from one transducer to the other. The transducers may be mounted on a reflector unit (not shown) arranged in the flow channel, including reflector holding elements and a measuring tube.

The measurement PCB further includes a processor 135 for controlling the measurement process and possible subsequent flow data processing, a non-volatile memory for storing calibration- and flow related data, and a connector 132 providing an interface for powering and communicating with the circuits of the measurement PCB. On top of the measurement PCB above the ultrasonic transducers, transducer backing devices 23, also shown in FIG. 5, are arranged to provide a holding force to the area of the PCB containing the ultrasonic transducers, thereby pressing the lower side of the transducers against the flow tube. The backing devices are connected with the flow tube to provide sufficient holding force to keep the transducers in place for the duration of the lifetime of the meter. The backing devices may for example be connected to the flow tube by mounting screw extending through the measurement PCB. In addition to providing the holding force to the transducers, mounting of the backing devices fixates the measurement PCB in the bottom of the meter housing. Hereby a measurement module for an ultrasonic flow meter according to embodiments of the invention is provided.

Figure 4A:
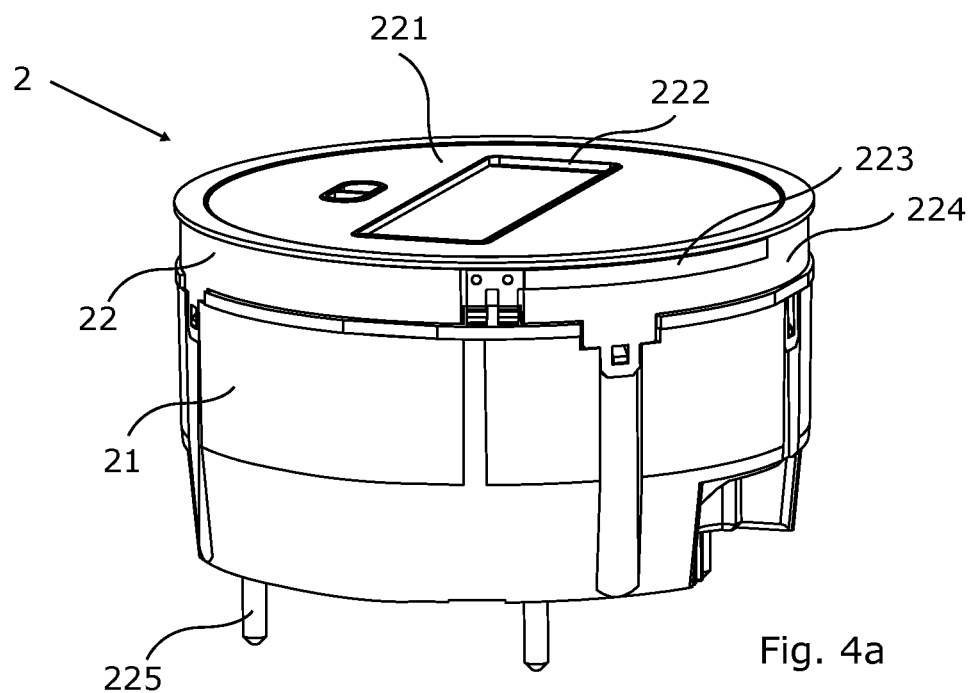
FIG. 4a shows a top-module of a modular ultrasonic flow meter.

Referring again to FIG. 2 and to FIG. 4*a*, the modular ultrasonic flow meter further includes a control module 2 arranged on top of the measurement PCB and backing devices inside the meter housing. The control module is another self-contained/individual module of the modular ultrasonic flow meter. The control module 2 includes a module housing 21 containing a self-contained power supply 16 including a battery pack as shown in FIG. 4*c*. A battery pack should be construed as an assembly of one or more battery cells 161, such as commonly known A, C or D-cells, optionally in combination with a hybrid layer capacitor 162 (HLC) (manufactured and sold by Tadiran Batteries™) or another type of capacitor. The battery pack may be wrapped or packed to appear as a common unit and provided with an electrical connector, such as a wire and plug-connector or battery mounted pins for engagement with plated through holes of a PCB. The module housing 21 further includes a compartment 211 for storing a desiccant. On top of the module housing a main printed circuit board (main PCB) 15 is mounted. The main PCB includes a central processing unit 151 for controlling operation of the ultrasonic flow meter, a memory circuit for storing meter related data, and a communication circuit for wireless communication with external units. Between the main PCB and the measurement PCB a power- and communication connection 17 is provided. To this end, the main PCB is provided with a connector 152 for being connected with the connector 132 of the measurement PCB through a connecting element 171. The connecting element may be the shown 6 pol pin header or another type pf connector adapted for providing a power—and communication connection between the main printed circuit board and the measurement printed circuit board. In addition to the power- and communication connection, the connecting element 171 also provides a tamper connection between the main PCB and the measurement PCB used for detecting potential tampering attempts. The tamper connection between the PCBs is used to detect whether the main PCB has been separated from the measurement PCB. The main PCB is also electrically connected to the battery pack via the electrical connector whereby the battery pack may supply each module of the ultrasonic flow meter through the main PCB. The main PCB thus serves as a hub for controlling and powering the ultrasonic flow meter. As shown in FIG. 4*b*, the main PCB further includes a display element 154 configured for displaying flow or fluid related data, a socket connector and a set of diodes configured for infra-red communications.

The control module further includes a front plate element 22 mounted onto top of the main PCB as seen from FIG. 4*a*. The module housing 21 and front plate element thus shield the upper and lower sides of the main PCB including the components and traces arranged thereon. This reduces the risk of damaging the main PCB during handling of the control module, which may be beneficial in connection with modular design and automated manufacturing.

An upper surface 221 of the front plate element is provided with an opening 222 adapted to receive the display element 154 and optionally the set of diodes 155 and the socket connector 156. An antenna element 223 is mounted along a circumferential edge 224 of the front plate element. The antenna element is connected with the communication circuit of the main PCB via contact surfaces 157 provided on the main PCB and provides an RF antenna for transmitting and/or receiving radio communication. Alternatively, the antenna element may be connected to the communication circuit via a connector, such as a socket, provided on the main PCB. Positioning the antenna element below the actual front plate of the flow meter, constituted by the upper surface of the front plate element, serves to protect and hide the antenna. Simultaneously, the antenna is positioned above the main PCT thereby improving antenna performance. Additionally, the control module is provided with guide pins 225 for positioning the control module inside the meter housing and aligning the connection between the main PCB and the measurement PCB.

The measurement PCB includes a processor and clock generator for controlling the time-of-flight flow measurement. The processor may be an independent component of integrated with the measurement circuit. This enables the measurement PCB to independently perform flow measurements and volume calculations. When the flow meter is assembled with the control module being connected to the measurement module, the measured flow and calculated volume are transmitted to a main PCB for display and remote reading. The main PCB is operated as the master and the measurement PCB as a slave, and the main PCB thus control when flow and volume data is transmitted from the measurement PCB. However, to reduce power consumption by the meter, the measurement PCB is configured to transmit a signal to the main PCB when new data is available. The main PCB thus configured to only request data form the measurement PCB when new data is available. In-between the transfer of flow and volume data from the measurement PCB to the main PCB, the measurement PCB stores the data. When the data has been transmitted to the main PCB, the measurement PCB may reset saved values related to volume and or flow.

As the measurement PCB is configured to independently performing flow measurements, the measurement module may be individually tested and legally verified for measurement purposes before completion of an entire ultrasonic flow meter. Verification equipment or other external equipment may be connected to the connector of the measurement PCB when the measurement module has been assembled, i.e. before the control module is inserted into the meter housing. The verification equipment may provide power and input to the circuits of the measurement PCB via the connector. Hereby the verification equipment may be used to control the measurement PCB to activate the processor and measurement circuit to measure the flow of a fluid in the flow tube. This may for example be done while the flow meter is arranged in a test facility, such as a flow bench, and the meter may hereby be legally verified for measurement purposes before completion. Being able to test and verify individual modules during production of a flow meter significantly improves the manufacturing process.

Referring to FIG. 6 another embodiment of a modular ultrasonic flow meter is shown. The flow meter 101 includes a substantially watertight meter housing 1012 mounted on a flow tube 1011. The meter housing is provided with hollow protrusions 125 extending from its bottom face. Each of the hollow protrusions are adapted for receiving a transducers electrically connected to the measurement circuit on the measurement PCB via a transducer connector 24. The transducer connector functioning both as an electrical connection as well as a backing device ensuring proper contact between the transducer and the bottom of the hollow protrusion. As see from FIG. 6, the protrusions are inserted into openings 1013 provided in the flow tube and the meter housing is fixed to the flow tube by a locking mechanism, screws or other means known to the skilled person. By having the flow tube and meter housing as separate parts, different materials may be used. The meter housing may for example be made from a polymer composition using injection molding and the flow tube may be made from a polymer composition, brass, stainless steel, etc.

Insides the meter housing a control module 2 similar to the previously described is arranged. The previous description of the control module (including reference numbers) also applies to the embodiment of FIG. 6. The control module includes a module housing 21, a main PCB 15 and a self-contained power supply 16. The main PCB is connected with the measurement PCB via a power- and communication connection 17, also similar to the previously described.

As stated above, modular ultrasonic flow meters according to embodiments of the present invention provide for an improved manufacturing process, amongst others by postponing variance creation. The measurement module and the control module may be separately created and tested. By creating a separate measurement module, the metering functionality may be tested and legally verified, before the whole meter is assembled. Similar, the control module may be assembled and tested before being inserted into the meter housing. The control modules may be created with different radio interfaces suitable for different communication systems and protocols. Examples of such communication systems may include standard cellular telecommunication systems (GSM, 2G, 3G, 4G, NB-IoT), Wireless M-Bus compliant radio communications systems and proprietary radio communication systems. Creating measurement- and control modules in this way allows for postponed variance creation as a measurement module may be combined with an appropriate control module in the final stages of the manufacturing process.

Different features and functionality of the above described modular ultrasonic flow meters may be implemented by means of hardware, software, firmware or any combination of these. Features and functionality can also be implemented as software running on one or more data processors and/or digital signal processors.

Elements of one embodiment may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A modular ultrasonic flow meter including:
a flow tube providing a flow channel extending between an inlet and an outlet;
a watertight meter housing connected to the flow tube;
a measurement printed circuit board including a measurement circuit communicating with one or more ultrasonic transducers, the measurement printed circuit board arranged in the meter housing for transmitting and receiving ultrasonic signals through the flow channel;
a self-contained power supply;
a control module comprising a module housing connected with a main printed circuit board including a central processing unit and a communication circuit, wherein the measurement printed circuit board and the one or more ultrasonic transducers are mounted in a bottom part of the meter housing and the control module is adapted to be inserted into the meter housing above the measurement printed circuit board; and
a power and communication connection between the main printed circuit board and the measurement printed circuit board;
wherein the self-contained power supply being arranged in the module housing to power the main printed circuit board and the measurement printed circuit board.

2. The modular ultrasonic flow meter according to claim 1, wherein the measurement printed circuit board includes a connector arranged for being connected with external equipment, before insertion of the control module, and wherein and the measurement printed circuit board is configured for being powered and controlled by input from the meter verification equipment.

3. The modular ultrasonic flow meter according to claim 2, wherein the power and communication connection is provided by a connecting element interconnecting the connector on the measurement printed circuit board with a connector provided on the main printed circuit board.

4. The modular ultrasonic flow meter according to claim 1, wherein a front plate element comprises an upper surface and a circumferential edge and wherein an antenna element connected with the communication circuit is mounted on the circumferential edge.

5. The modular ultrasonic flow meter according to claim 1, wherein the module housing includes a compartment for storing a desiccant.

6. The modular ultrasonic flow meter according to claim 1, further comprising a front plate element mounted on top of the control module to cover the main printed circuit board.

7. The modular ultrasonic flow meter according to claim 1, wherein the main printed circuit board comprises an additional connector for connecting a peripheral device arranged in the meter housing, the additional connector being adapted for powering the peripheral device and for providing communication between the central processing unit and the peripheral device.

8. The modular ultrasonic flow meter according to claim 1, further comprising a display element mounted on the main printed circuit board.

9. The modular ultrasonic flow meter according to claim 1, wherein the meter housing is integrated with and extending from the flow tube.

10. The modular ultrasonic flow meter according to claim 1, wherein the one or more transducers are surface mounted on the measurement printed circuit board.

11. The modular ultrasonic flow meter according to claim 1, wherein the meter housing is mounted on the flow tube.

12. The modular ultrasonic flow meter according to claim 1, wherein the meter housing is provided with hollow protrusions extending from its lower side, the protrusions being adapted for receiving the one or more ultrasonic transducers and for being inserted into corresponding openings in the flow tube.

13. The modular ultrasonic flow meter according to claim 1, wherein the one or more ultrasonic transducers are connected with the measurement printed circuit board via transducer connectors.

\* \* \* \* \*